US009154403B2

(12) United States Patent
Vadlakonda et al.

(10) Patent No.: US 9,154,403 B2
(45) Date of Patent: Oct. 6, 2015

(54) IDENTIFYING THE BEST SERVICE PROVIDER LINK FOR PERFORMANCE ROUTING

(75) Inventors: Sravan Vadlakonda, Sunnyvale, CA (US); Pritam Shah, Fremont, CA (US); Rahul G. Patel, Nashua, NH (US)

(73) Assignee: Cisco Technology, Inc., San Jose, CA (US)

( * ) Notice: Subject to any disclaimer, the term of this patent is extended or adjusted under 35 U.S.C. 154(b) by 339 days.

(21) Appl. No.: 13/525,586

(22) Filed: Jun. 18, 2012

(65) Prior Publication Data

US 2013/0336167 A1 Dec. 19, 2013

(51) Int. Cl.
 *H04L 12/28* (2006.01)
 *H04L 12/56* (2006.01)
 *H04L 12/715* (2013.01)

(52) U.S. Cl.
 CPC ..................................... *H04L 45/04* (2013.01)

(58) Field of Classification Search
 USPC .................. 370/225, 232, 328; 709/238, 239
 See application file for complete search history.

(56) References Cited

U.S. PATENT DOCUMENTS

| | | | |
|---|---|---|---|
| 7,107,334 B1 * | 9/2006 | Shaffer et al. ................. 709/224 |
| 7,606,159 B2 | 10/2009 | Dalal et al. |
| 8,451,745 B2 | 5/2013 | Weng et al. |
| 8,559,426 B2 | 10/2013 | Lear et al. |
| 8,625,485 B2 * | 1/2014 | Lee et al. ...................... 370/328 |
| 2007/0280108 A1 * | 12/2007 | Sakurai ......................... 370/232 |
| 2009/0228575 A1 * | 9/2009 | Thubert et al. ................ 709/220 |

OTHER PUBLICATIONS

Cisco Systems; IP SLAs RTP-Based VoIP Operation; Feb. 27, 2006; http://www.cisco.com/c/en/us/td/docs/ios/12_4t/12_4t4/htrtpvip.pdf.

* cited by examiner

*Primary Examiner* — Edan Orgad
*Assistant Examiner* — Sithu Ko
(74) *Attorney, Agent, or Firm* — P. Su

(57) ABSTRACT

In one embodiment, a method includes obtaining a first packet included in a flow to be forwarded to a border router, and replicating the first packet to create a duplicate. The first packet is forwarded onto a first set of links, and the duplicate is forwarded onto a second set of links, to the border router. First information relating to the first packet and the first set of links, and second information relating to the duplicate and the second set of links, is obtained. The first information and the second information are used to determine whether to forward the flow on the first set of links. The first set of links is used to forward the flow if it is determined that the first set of links is to be used to forward the flow, otherwise the second set of links is used to forward the flow.

21 Claims, 8 Drawing Sheets ated as a primary link and another links is identified as a
IDENTIFYING THE BEST SERVICE PROVIDER LINK FOR PERFORMANCE ROUTING

TECHNICAL FIELD

The disclosure relates generally to routing packets through networks. More particularly, the disclosure relates to enabling a border router to accurately select the best service provider to use to handle a flow through replicating the flow and sending the flow using a plurality of service providers.

BACKGROUND

Customers, e.g., enterprise networks, often have multiple links to a wide area network (WAN). The multiple links may be privately held of managed by different service providers. Typically, when a customer has multiple links, one link is identified as a primary link and another links is identified as a backup link. The primary link is used to transmit data through a WAN whenever the primary link is available and performs as expected, and when the primary link is not available and/or does not perform as expected, the backup link is used.

The selection of a primary link, from among a plurality of links associated with a customer, generally involves creating probes, and sending probes on the plurality of links. The use of probes allows a customer to identify characteristics of the different links and, using the characteristics, the customer may identify a particular link for use as a primary link. Probes may include general probes and probes arranged to represent a particular flow.

As will be appreciated by those skilled in the art, while a probe is arranged to represent a particular flow fairly closely, a probe typically does not accurately representation the particular flow. That is, while a probe sent on a link may be intended to represent an actual flow that is to be sent on the link, a probe generally is not an accurate representation of the actual flow. Thus, even when a primary link is selected because the use of a probe indicates a particular level of performance, because a probe may not be a wholly accurate representation of an actual flow, the level of performance achieved when an actual flow sent over the primary link may not be as expected.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1:
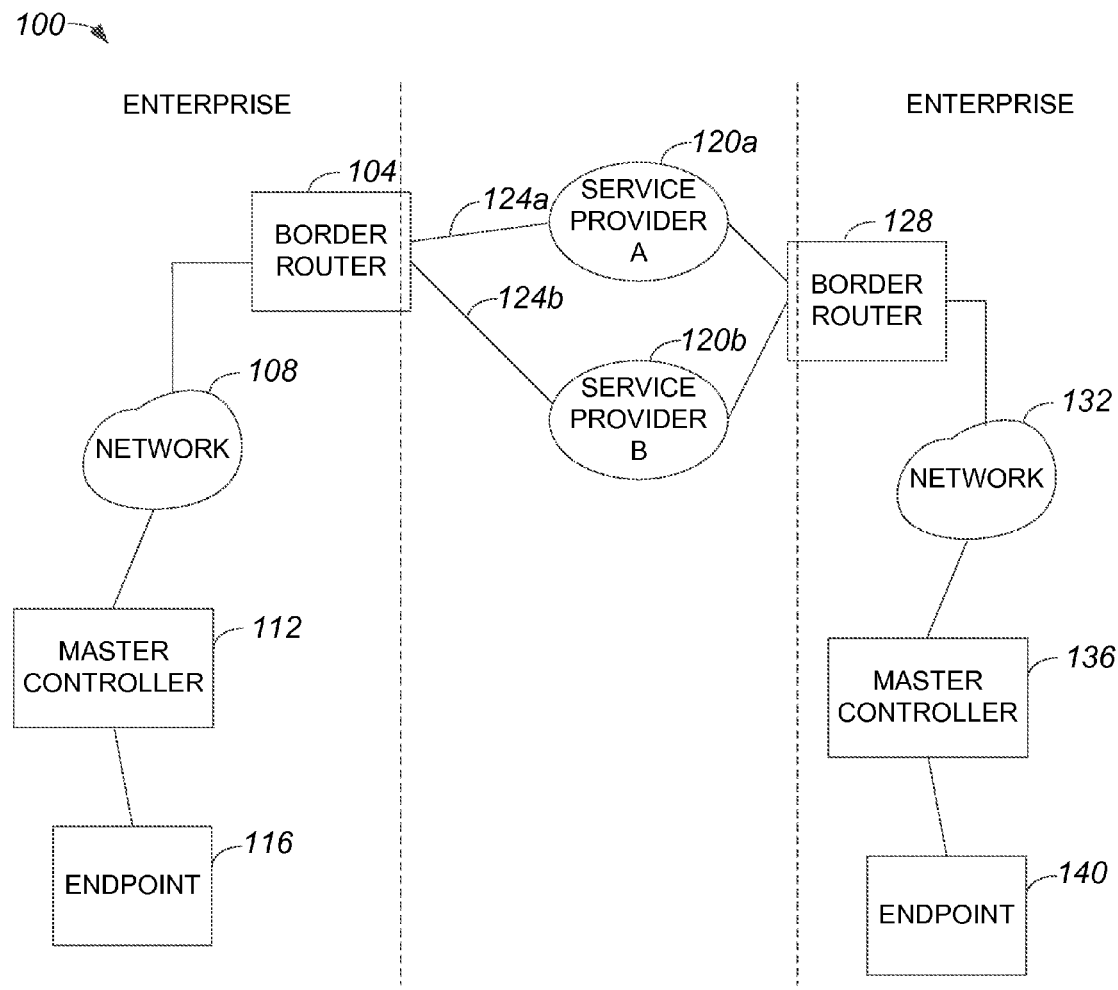
FIG. 1 is a diagrammatic representation of an overall network in which a border router may replicate traffic to send using links associated with two or more service providers in accordance with an embodiment.

According to one aspect, a method includes obtaining, at a first border router arrangement associated with an enterprise, at least a first packet included in a flow to be forwarded to at least a second border router arrangement in communication with the first border router arrangement through at least a first set of links and a second set of links. The method also includes replicating, at the first border router arrangement, the first packet to create a least one duplicate of the first packet, as well as forwarding the first packet onto the first set of links and forwarding the duplicate onto the second set of links. Information relating to the first packet and the first set of links, as well as information relating to the duplicate and the second set of links, is obtained by the first border router arrangement. Using the information relating to the first packet and the information relating to the duplicate, it is determined whether to forward the flow on the first set of links. The first set of links is selected for use in forwarding the flow if it is determined that the first set of links is to be used to forward the flow, and the second set of links is selected for use in forwarding the flow if it is determined that the first set of links is not to be used to forward the flow.

Description

The ability to select a particular service provider network for use in forwarding or otherwise sending traffic through a network, e.g., a wide area network (WAN), based on an accurate assessment of the performance of the particular service provider increases the likelihood that a best service provider for the traffic may be selected. When actual traffic, e.g., an actual packet flow received on a border router of an enterprise from an endpoint, is used to effectively gauge different service provider networks to identify one service provider network to be used to forward the actual traffic, the performance of the different service provider networks relative to the actual traffic may be relatively accurately determined. As a result, a best service provider network for use in forwarding the actual traffic may essentially be identified.

When a customer edge node, as for example a border router, obtains at least one packet from one endpoint that is to be forwarded through a network to another endpoint, the customer edge node may identify potential service provider links on which the packet may be sent. Once the potential service provider links are identified, the packet may be copied, and the "original" packet and copied versions of the packet may be sent on the potential service provider links. Characteristics, e.g., jitter and packet loss, may be determined relative to each of the potential service provider links, and the characteristics may be used by the customer edge node to select a service provider link for use in forwarding packets through the network. In other words, a customer edge node may select a best path for a given flow based on the results obtained when an original packet and replicated or duplicated representations of the packet are sent through the network on a plurality of service provider networks.

In one embodiment, packets that are to be replicated, e.g., duplicated, in an effort to identify a substantially best path for use in transmitting packets are part of real-time transport protocol (RTP) traffic or an RTP flow. It should be appreciated that a replica, or a duplicate, of a packet contains the same information as contained in the packet, and is essentially an exact copy of the packet. A customer edge node may select a substantially best path for a given RTP flow using information that is effectively gathered when packets and corresponding replicated packets are sent along different paths. The gathered information may include, but is not limited to including, information that allows jitter, latency, and packet loss to be determined. For RTP packets, sequence numbers and timestamps stored in the RTP packets may be used to determine characteristics such as a loss and jitter. It should be appreciated that characteristics such as a delay, e.g., a one-way delay, may effectively be measured when differences in arrival times for packets and replicated packets are processed.

Referring initially to FIG. 1, an overall network in which a customer edge node may effectively copy traffic to send using links associated with two or more service providers will be described in accordance with an embodiment. An overall communications network 100 may include a first enterprise that includes a border router 104 arranged to enable a network 108 within the first enterprise to communicate through a link 124a associated with a first service provider 120a and a link 124b associated with a second service provider 120b with a border router 128 associated with a second enterprise. Service providers 120a, 120b may include, but are not limited to including, network service providers, phone service providers, telecommunications service providers, and/or providers of substantially any communication services.

Network 108, which may be a local area network (LAN), may communicate with an endpoint 116 through a master controller 112. A network 132, which may also be a LAN, may communicate with an endpoint 140 through a master controller 136. When a source, e.g., endpoint 116, intends to provide packets in a flow to a destination, e.g., endpoint 140, the packets are obtained by border router 104. Border router 104 may select the best path on which to forward packets towards endpoint 140.

Border router 104 may, upon obtaining traffic or a flow via network 108, determine whether to create copies of packets in the flow for the purpose of identifying a particular service provider 120a, 120b for use in forwarding the traffic. In one embodiment, when border router 104 identifies RTP traffic, border router 104 may create copies of packets in the traffic. The actual packets included in the traffic may be forwarded, for example, on link 124a while copies of the actual packets, e.g., replicas or duplicates, may be forwarded on link 124b.

Figure 2A:
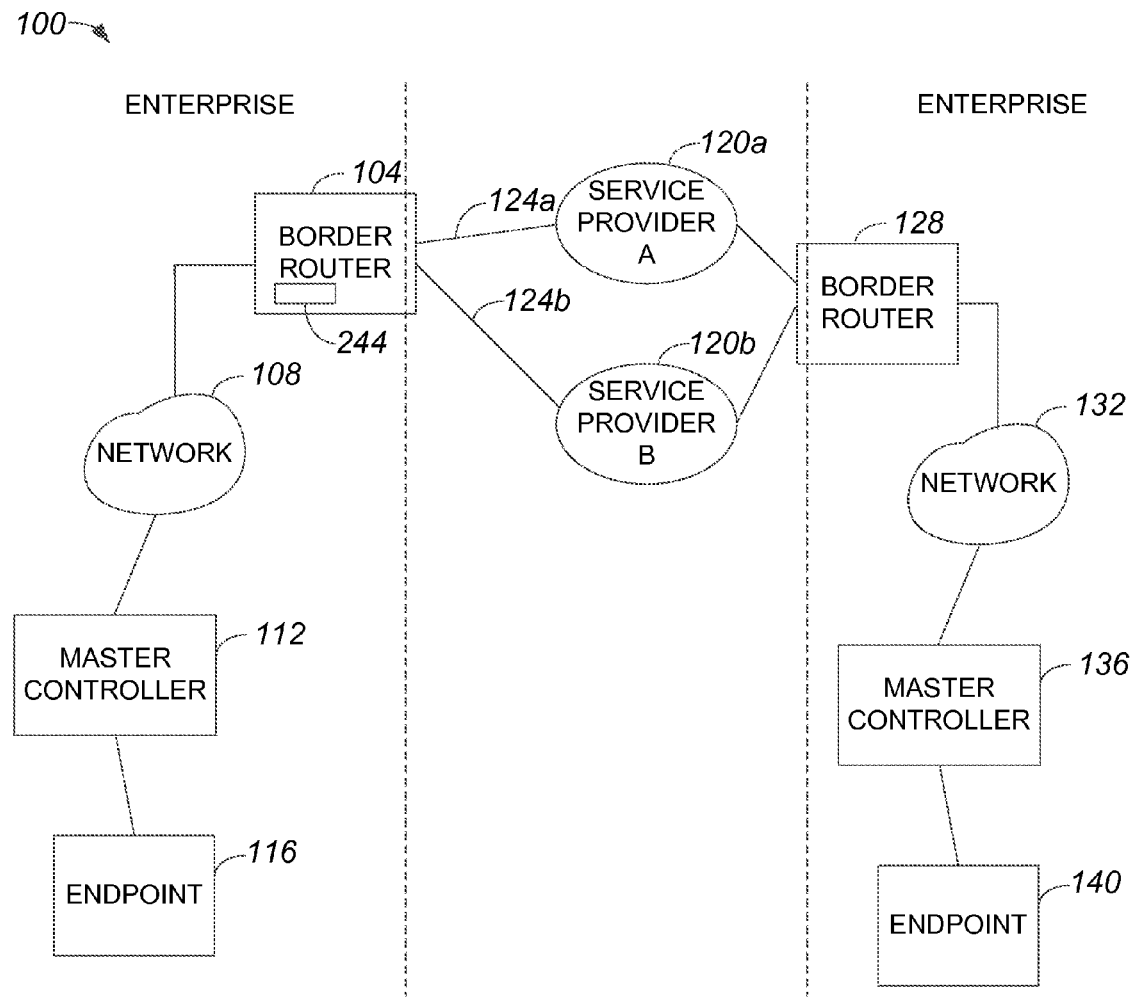
FIG. 2A is a diagrammatic representation of an overall network in which a border router may replicate traffic to send using links associated with two or more service providers, e.g., network 100 of FIG. 1, at a time t1 at which traffic is received from an endpoint in accordance with an embodiment.

FIG. 2A is a diagrammatic representation of an overall network in which a border router may copy traffic to send using links associated with two or more service providers, e.g., network 100 of FIG. 1, at a time t1 at which traffic is received from an endpoint in accordance with an embodiment. At a time t1, traffic or a flow that includes at least one packet 244 is obtained by border router 104. The traffic or flow that includes packet 244 may be obtained from endpoint 116 through master controller 112 and network 108. In the described embodiment, packet 244 is an RTP packet, and is a part of actual traffic or an actual traffic flow.

When border router 104 obtains packet 244, border router 104 may identify whether packet 244 is an RTP packet. If packet 244 is an RTP packet, then border router 104 identifies suitable service providers 120a, 120b through which to forward packet 244. Suitable service providers 120a, 120b generally include available service providers, e.g., service providers with sufficient bandwidth to accommodate the flow which includes packet 244. In the embodiment as shown, service providers 120a, 120b are available routes for use by a flow that includes packet 244.

Border router 104 may determine that a flow associated with packet 244 may be forwarded from border router 104 to border router 128 through link 124a associated with service provider "A" 120a, and also from border router 104 to border router 128 through link 124b associated with service provider "B" 120b, border router 104 may replicate packet 244. As a result, border router 104 may replicate packet 244 such that packet 244 may be transmitted through link 124a, and a replicated packet may be transmitted through link 124b.

Figure 2B:
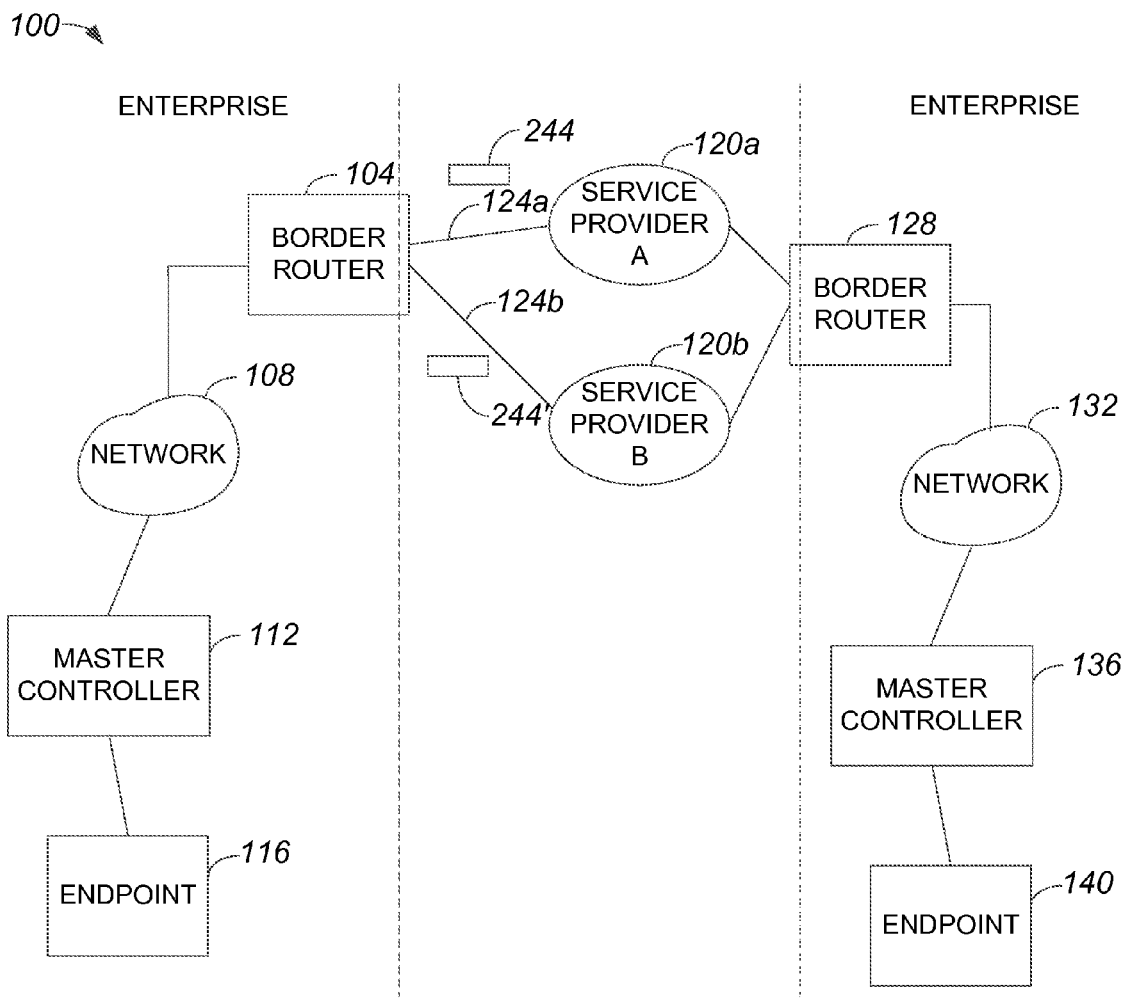
FIG. 2B is a diagrammatic representation of an overall network in which a border router may replicate traffic to send using links associated with two or more service providers, e.g., network 100 of FIGS. 1 and 2A, at a time t2 at which traffic received from an endpoint is replicated and sent in accordance with an embodiment.

At a time t2, as shown in FIG. 2B, packet 244 and a replicated packet 244' are sent on link 124a and on link 124b, respectively. In other words, packet 244 is sent from border router 104 to border router 128 through a network associated with service provider "A" 120a, and a replica 244', e.g., a duplicate, of packet 244 is sent from border router 104 to border router 128 through a network associated with service provider "B" 120b. It should be appreciated that more than one packet 244 associated with a flow is typically replicated.

In one embodiment, using information gathered by packet 244 and replica 244', border router 128 may determine jitter and packet loss associated with the network associated with service provider "A" 120a and the network associated with service provider "B" 120b. Such information may be provided to border router 104, and border router 104 may determine whether to select the network associated with service provider "A" 120a or to select the network associated with service provider "B" 120b to forward the flow associated with packet 244.

Figure 3:
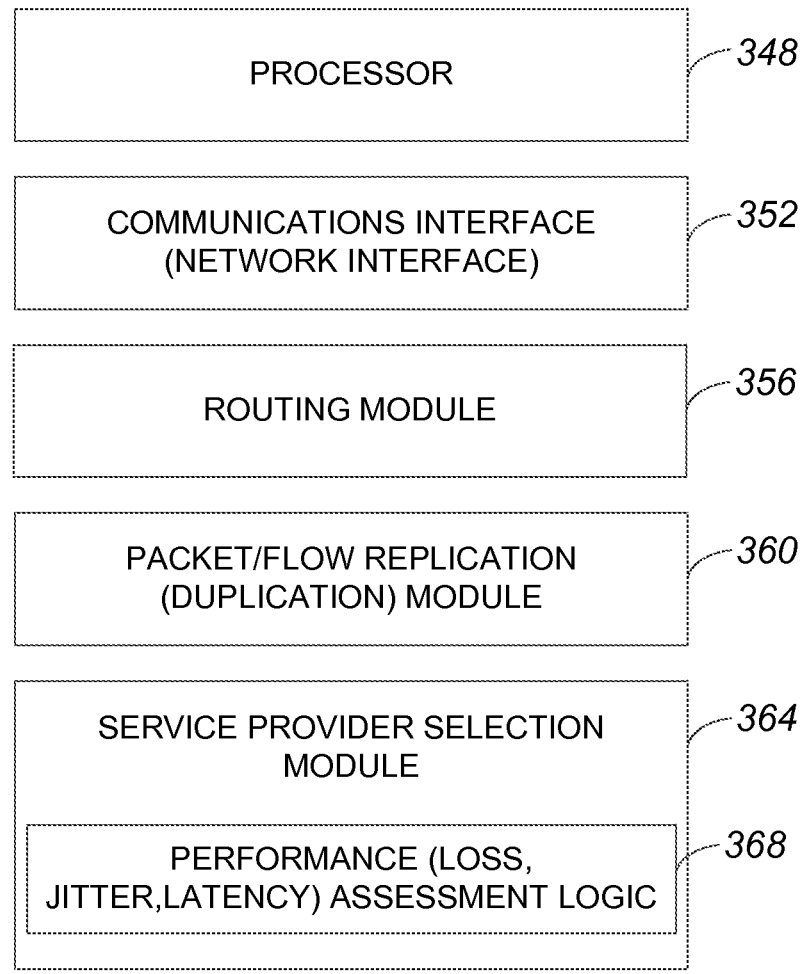
FIG. 3 is a block diagram representation of a router arranged to replicate traffic, e.g., border router 104 of FIG. 1, in accordance with an embodiment.

In general, border router 104 is arranged to determine when replica 244' is to be generated. When packet 244 is part of an RTP flow, i.e., when packet 244 is an RTP packet, border router 104 may determine that replica 244' is to be created. With reference to FIG. 3, a router arranged to copy, e.g., replicate or duplicate, packets that are part of a flow or traffic, e.g., border router 104 of FIG. 1, will be described in accordance with an embodiment. A router 104 may serve as a gateway between an enterprise and a WAN, and includes a processor 348, a communications interface 352, and a routing module 356. Processor 348 may include a processing unit and a control unit, and may execute computer programs or codes.

Communications interface 352 may be a network interface, and allows border router 104 to communicate within any number of networks. Communications interface 352 generally includes any number of input/output (I/O) ports, and may communicate within an enterprise and with at least one WAN. For example, communications interface 352 may communicate within an internal network associated with an enterprise of which border router 104 is a part, and may also communicate through links associated with different service provider networks.

Routing module 356 includes, but is not limited to including, functionality that allows border router 104 to forward or otherwise send packets obtained by border router 104 towards desired destinations for the packets. Routing module 356 generally allows packets to be routed from a source towards an intended destination as the packets pass through border router 104.

Border router 104 also includes a packet/flow replication module 360. It should be appreciated that packet/flow replication module 360 may include hardware and/or software logic that may be executed by processor 348. Packet/flow replication module 360 is arranged to determine when at last one packet included in a flow obtained by border router 104 for forwarding through a WAN is to be copied, e.g., replicated or duplicated. Such a determination may be made based on any number of factors. In one embodiment, a determination of whether at least one packet of a flow is to be duplicated may be based on the type of the flow. For example, at least one packet of a flow may be duplicated if the flow is a RTP flow.

A service provider selection module 364 includes hardware and/or software logic that may be executed by processor 348. Service provider selection module 364 may be configured to identify a suitable, e.g., best, service provider network for use in forwarding a flow or traffic through a WAN. As will be appreciated by those skilled in the art, the identification of a best service provider network may be based on the performance of available service provider networks. Service provider selection module 364 is generally arranged to identify available or potential service provider networks for use in forwarding a flow, and to cause a packet and at least one copy of the packet, e.g., at least one replica or duplicate or the packet, to be forwarded through communications interface 352 on links associated with the available service provider networks.

Service provider selection module 364 is configured to obtain information through different service provider networks relating to the performance associated with sending at least one packet and at least one copy of the packet using the different service provider networks. By way of example, a border router reached through a service provider network that receives at least one packet from border router 104 may provide performance information to service provider selection module 364. Typically, performance information may be provided in a corresponding RTP Control Protocol (RTCP) session for an RTP session, although it should be appreciated that performance information may instead to included in an out-of-band packet, e.g., a packet that culminates multiple flow reports. The performance information may include, but is not limited to including, an indication of loss, an indication of jitter, and/or an indication of latency associated with transmitting at least one packet on at least one link associated with a particular service provider.

Performance assessment logic 368 may assess the performance associated with different service provider networks. In one embodiment, parameter assessment logic 368 may compare loss, jitter, and/or latency information associated with different service providers to identify a best service provider to use to forward a flow. While performance assessment logic 368 may be arranged to use performance information obtained from a remote border router, e.g., a border router that receives at least one packet associated with a flow on network associated with one service provider and receives a copy of the packet on a network associated with a second service provider, it should be appreciated that performance assessment logic 368 may instead use information received from the border router to effectively generate performance information.

In one embodiment, when an enterprise includes additional border routers in addition to border router 104, service provider selection module 364 may be arranged to cooperate with service provider selection modules of other border routers to identify a best service provider network for use in forwarding a flow associated with the enterprise. That is, functionality associated service provider selection module 364 may effectively be distributed across multiple border routers.

Figure 4A:
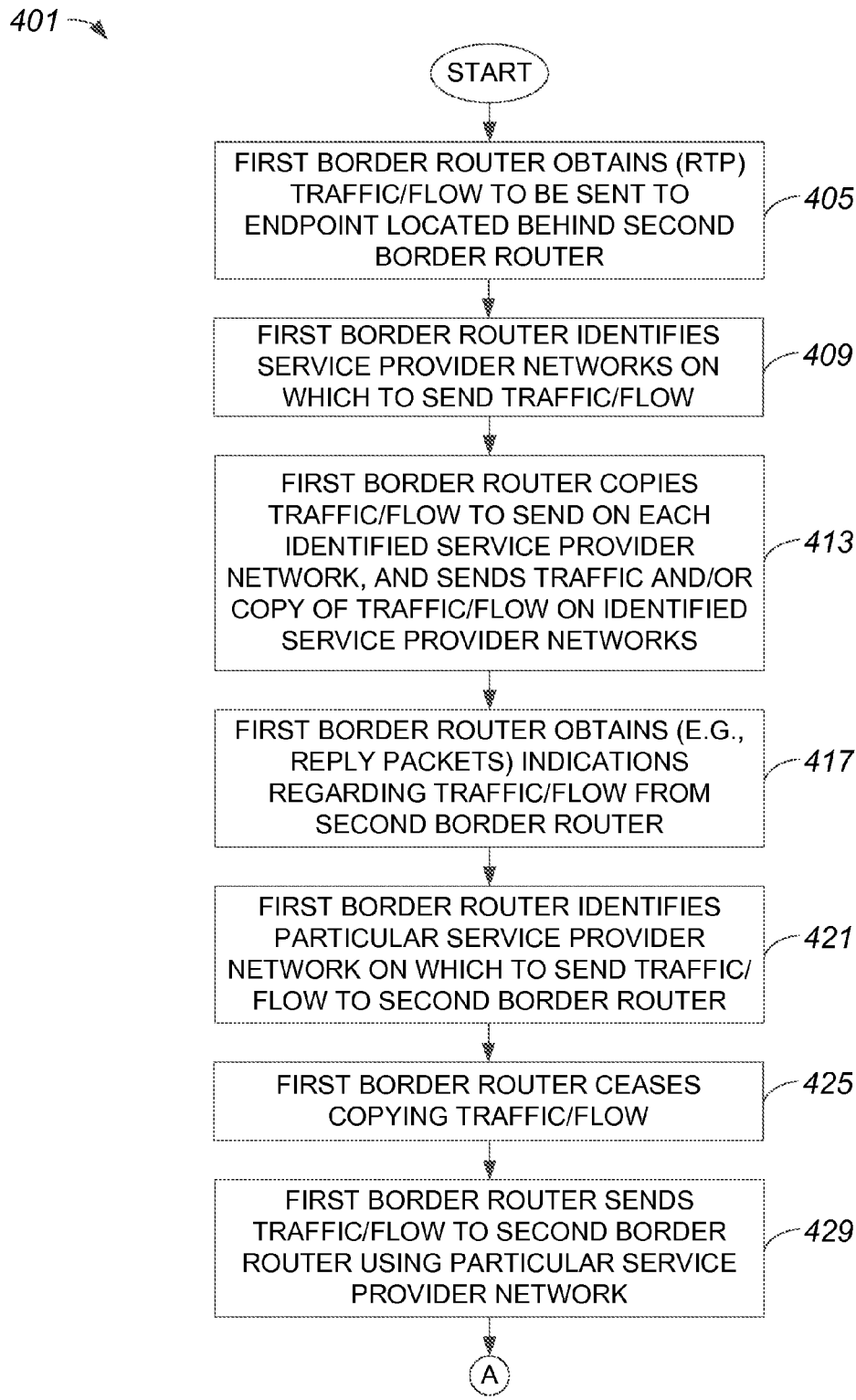
FIGS. 4A and 4B are a process flow diagram which illustrates a method of selecting a best service provider network for use in sending traffic in accordance with an embodiment.
Figure 4B:
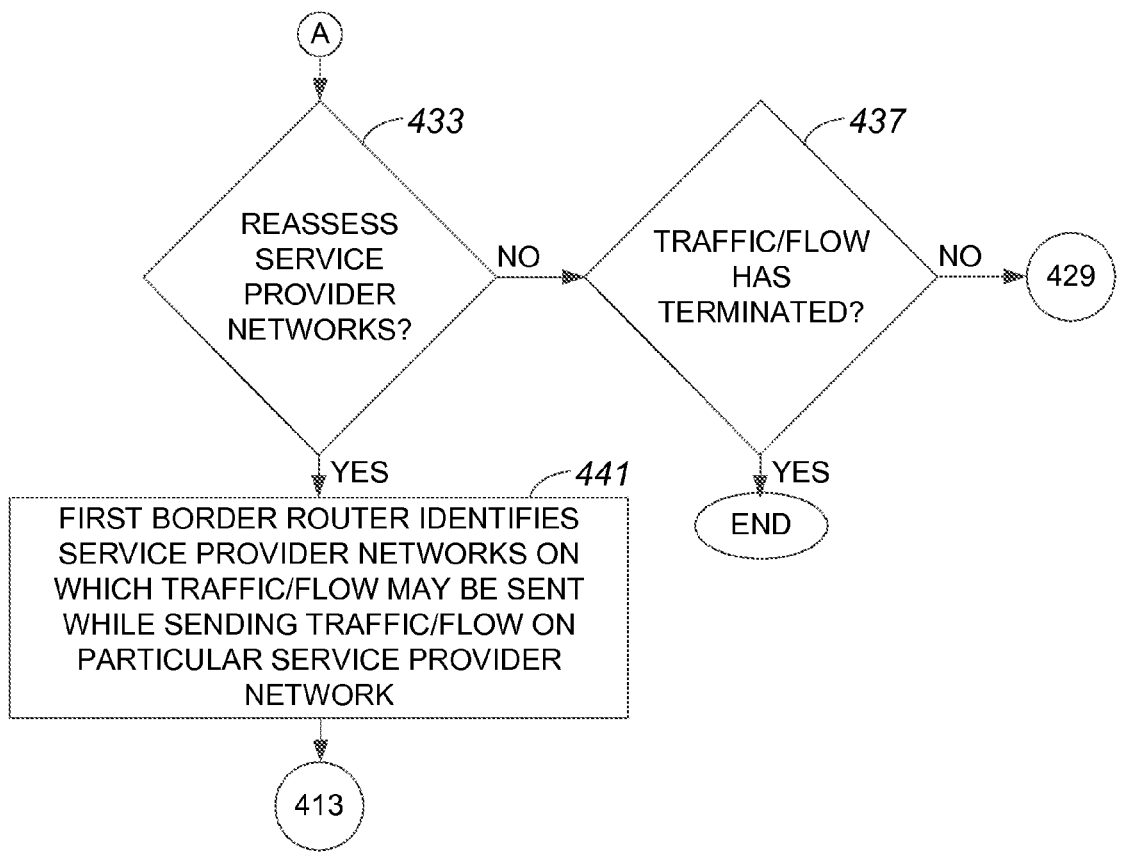

FIGS. 4A and 4B are a process flow diagram which illustrates a method of selecting a best service provider network for use in sending traffic in accordance with an embodiment. A method 401 of selecting a best service provider network for use in forwarding a flow begins at step 405 in which a first border router, e.g., a border router of a first enterprise, obtains traffic or a flow that is to be sent to an endpoint located behind a second border router. The traffic or flow may be video traffic, and may be obtained from an endpoint within the first enterprise through a master controller and a local network of the enterprise. The endpoint from which the traffic is obtained may be a source of the traffic, and the endpoint behind the second border router may be a destination for the traffic.

In step 409, the first border router identifies service provider networks on which traffic may be sent to the second border router. Typically, the identified service provider networks are service provider networks which are available to carry traffic to the second border router, e.g., are service provider networks that have sufficient available bandwidth to accommodate the traffic. It should be appreciated that the number of service provider networks identified may vary widely.

After service provider networks on which traffic may be sent are identified, the first border router copies the traffic, e.g., copies at least one packet included in the traffic, and sends the traffic and the copies on the identified service provider networks in step 413. The actual traffic may be sent on one of the identified service provider networks, and copies of the traffic may be sent on other identified service provider networks. In other words, the actual traffic may be forwarded on one identified service provider network, and for every other identified service provider network, a copy of the actual traffic may be forwarded.

Once traffic and copies of the traffic are sent by the first border router, the first border may obtain indications regarding the forwarded traffic, as well as indications regarding the copies of the traffic, from the second border router in step 417. The indications may be related to performance metrics, and may be provided in reply packets from the second border router.

Using the indications, the first border router identifies a network of a particular service provider in step 421 on which to send traffic to the second border router. By way of example, the first border router may determine a best service provider network for use in forwarding traffic based upon the indications obtained in step 417. Such a determination may be based upon, but is not limited to being based upon, the particular requirements of the first enterprise, service level agreements (SLAs), and/or traffic considerations.

After a particular service provider network is identified or selected, the first border router ceases copying the traffic in step 425. As a particular service provider has been selected for use in forwarding traffic, first border router does not need to copy the traffic for the purposes of identifying a best service provider for use in forwarding traffic. The first border router sends the traffic to the second border router using the particular service provider network in step 429.

A determination is made in step 433 as to whether to reassess the service provider networks. That is, it is determined whether to gauge the performance of available service provider networks to assess whether the particular service provider network currently in use to forward the traffic is still the substantially best choice for a service provider network. As conditions associated with different provider networks may change, reassessing the service provider networks may result in the selection of a better service provider network for use in forwarding the traffic.

If the determination in step 433 is that the service provider networks are not to be reassessed, the implication may be that it is not an appropriate time to reassess the service provider networks, that reassessing the service provider networks would be inefficient, or that there is no more traffic to forward. As such, process flow moves to step 437 in which it is determined whether the traffic has terminated. If it is determined that the traffic has terminated, the indication is that there is no additional traffic to forward to the second border router. As such, the method of selecting a best service provider network for use in forwarding a flow is completed. Alternatively, if it is determined in step 437 that the traffic has not terminated, process flow returns to step 429 in which the first border router continues to forward traffic to the second border router using the particular service provider network.

Returning to step 433, if the determination is that the service provider networks are to be reassessed, then the first border router identifies service provider networks on which traffic may be sent in step 441 while sending traffic on the particular service provider network. Process flow then returns to step 413 in which the first border router copies the traffic to send on each identified service provider network, and sends the traffic on one identified service provider network and copies of the traffic on other identified service provider networks.

Figure 5:
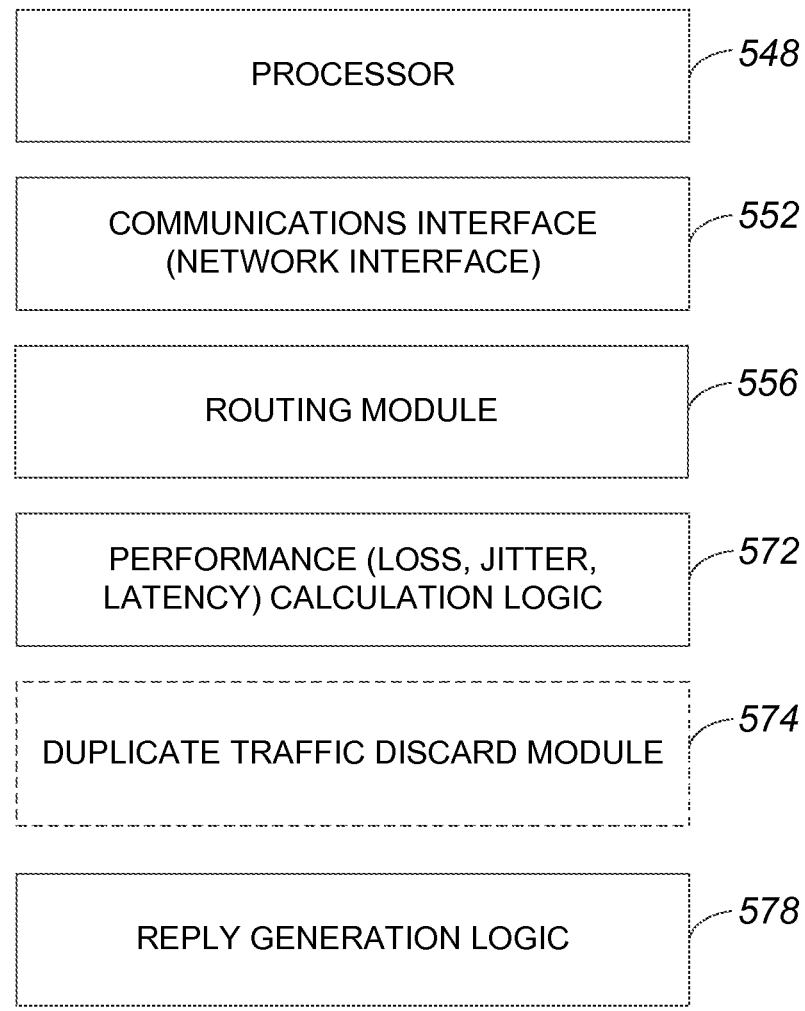
FIG. 5 is a block diagram representation of a router arranged to receive replicated traffic, e.g., border router 128 of FIG. 3, in accordance with an embodiment.

In general, a border router that receives a packet and a copy of the packet, e.g., a replica or a duplicate of the packet, is configured to forward the packet to an endpoint, and may cause the copy of the packet to be discarded. FIG. 5 is a block diagram representation of a router arranged to receive packets and copies of the packets, e.g., border router 128 of FIG. 3, in accordance with an embodiment. A border router 128 includes a processor 548 and a communications interface 552. Communications interface 552 includes input/output ports, and is configured to obtain packets from links associated with any number of service providers. Communications interface 552 is also configured to allow border router 128 to communicate with a local network, e.g., a network associated with an enterprise in which border router 128 is included.

A routing module 556 includes hardware and/or software logic that is configured to allow border router 128 to route traffic obtained through communications interface 552 to an intended destination. Performance calculation logic 572 is configured to obtain information from received packets, e.g., packets associated with a particular flow and copies of the packets associated with the particular flow, and to use the obtained information to calculate performance metrics. In one embodiment, when received packets are RTP packets, the information obtained from the received packets may include sequence numbers contained in the RTP packets and timestamps included in the RTP packets.

Performance metrics include, but are not limited to including, packet loss, jitter, and/or latency. Performance calculation logic 572 may, upon calculating performance metrics, may provide the performance metrics or indications relating to the performance metrics to a border router that provided the received packets to border router 128. In other words, performance calculation logic 572 may provide performance metrics to a border router that is attempting to identify a best service provider network to use in forwarding a flow to border router 128. In general, performance information may be provided out-of-band. For example, performance information may be provided in an out-of-band packet.

In general, when border router 128 obtains a packet and a copy of the packet, border router 128 may forward both the packet and the copy of the packet to an endpoint. Typically, an endpoint will be able to drop any duplicate packets. However, in one embodiment, border router 128 may include an optional duplicate traffic discard module 574 that includes logic operable to cause duplicate packets to be dropped.

Figure 6:
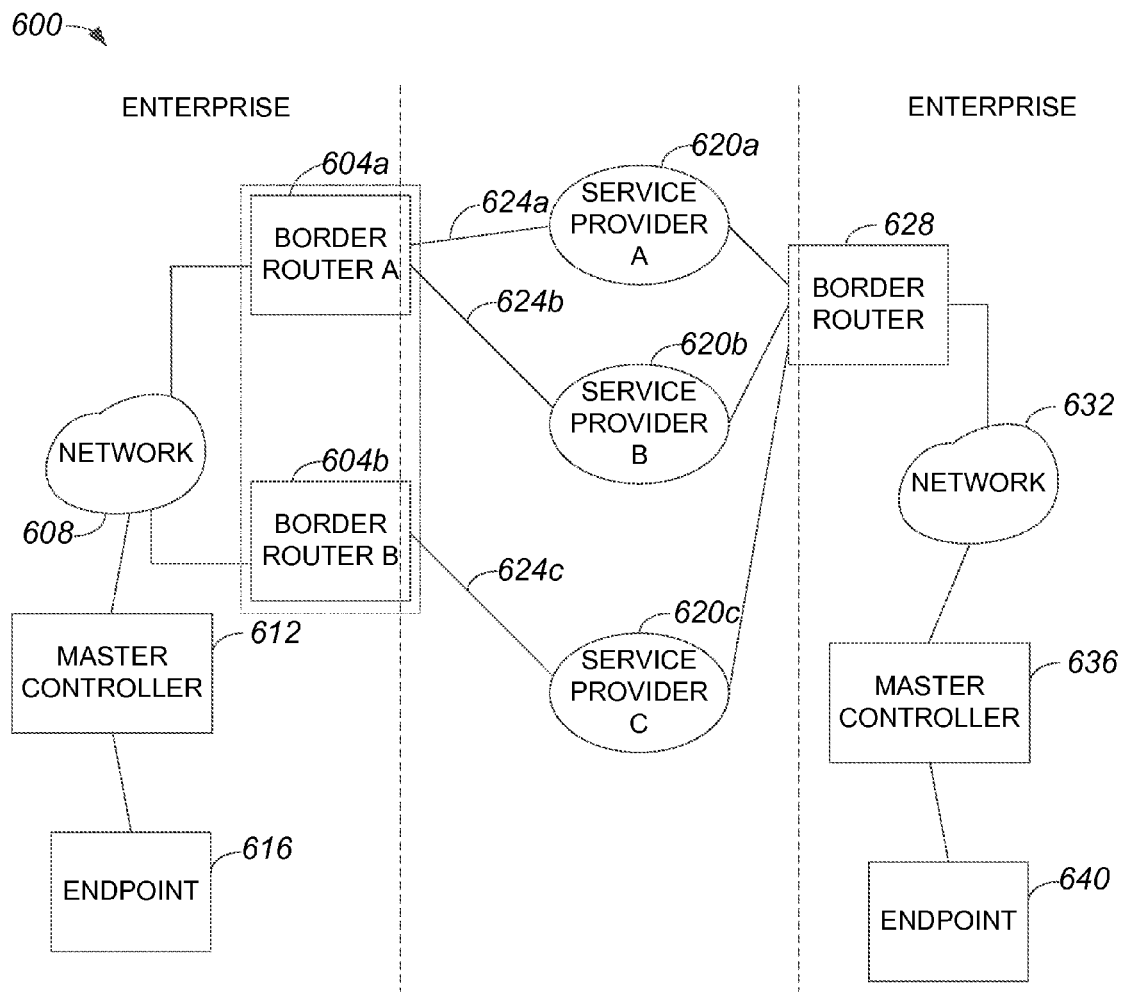
FIG. 6 is a diagrammatic representation in which a plurality of border routers may send replicated traffic on links associated with two or more service providers in accordance with an embodiment.

An enterprise may include multiple border routers. By way of example, an enterprise may include an overall border router arrangement that includes more than one border router that is arranged to create copies of packets associated with a flow to facilitate the identification of a best service provider network for use in forwarding the flow through a WAN. FIG. 6 is a diagrammatic representation in which a plurality of border routers of an overall border router arrangement may send replicated or duplicated traffic on links associated with two or more service providers in accordance with an embodiment. An overall communications network 600 may includes a first enterprise which has border routers 604*a*, 604*b* that effectively form a border router arrangement.

The border router arrangement is arranged to enable a network 608 within the first enterprise to communicate through a link 624*a* associated with a first service provider 620*a*, a link 624*b* associated with a second service provider 620*b*, and a link 624*c* associated with a third service provider 620*c*. As shown, first border router 604*a* may communicate using links 624*a*, 624*b*, and second border router 604*b* may communicate using link 624*c*. Through service provider networks associated with links 624*a*-*c*, the border router arrangement may communicate with a border router 628 associated with a second enterprise. That is, three service providers 620*a*-*c* may allow the border router arrangement to forward traffic to border router 628.

Network 608, which may be a LAN, may communicate with an endpoint 616 through a master controller 612. A network 632, which may also be a LAN, may communicate with an endpoint 640 through a master controller 636. When a source, e.g., endpoint 616, intends to provide packets in a flow to a destination, e.g., endpoint 640, the packets are obtained by the border router arrangement. Within the border router arrangement, first border router 604*a* and second border router 604*b* may cooperate to identify the best path, e.g., based on performance, on which to forward packets towards endpoint 640. Generally, the border router arrangement causes a service provider network to be selected for use in forwarding traffic. In one embodiment, either first border router 604*a* or second border router 604*b* may be configured to use information obtained through first border router 604*a* and second border router 604*b* to identify a best service provider network on which to forward traffic.

Border routers 604*a*, 604*b* may, upon obtaining traffic or a flow via network 608, cause a determination as to whether to create copies of packets in the flow for the purpose of identifying a particular service provider 620*a*-*c* for use in forwarding the traffic. In one embodiment, when border routers 604*a*, 604*b* identify RTP traffic, at least one of border routers 604*a*, 604*b* may create copies of packets in the traffic. The actual packets included in the traffic may be forwarded, for example, on link 624*a* while copies of the actual packets, e.g., replicas or duplicates, may be forwarded on links 624*b*, 624*c*

Although only a few embodiments have been described in this disclosure, it should be understood that the disclosure may be embodied in many other specific forms without departing from the spirit or the scope of the present disclosure. By way of example, while a customer edge node such as a border router has been described as being associated with an enterprise and configured to allow endpoints within the enterprise to communicate with remote endpoints through a service provider network, a customer edge node is not limited to being associated with an enterprise. In general, a customer edge node may be associated with any suitable customer network, e.g., a local area network (LAN).

The functionality associated with a border router that replicates or duplicates packets of a flow, e.g., border router 104 of FIG. 1, and the functionality associated with a border router that receives replicated or duplicated packets of a flow, e.g., border router 128 of FIG. 1, may be included in a single border router. That is, each border router in an overall network that replicates or duplicates packets of a flow in order to identify a best service provider network for use in forwarding the flow may be arranged to replicate or duplicate packets, and to receive replicated or duplicated packets.

Packets that are included in RTP traffic or an RTP flow may generally be any suitable packets. In one embodiment, the packets may be associated with a video flow. It should be appreciated, however, that the packets are not limited to being associated with a video flow.

The embodiments may be implemented as hardware and/or software logic embodied in a tangible, i.e., non-transitory, medium that, when executed, is operable to perform the various methods and processes described above. That is, the logic may be embodied as physical arrangements, modules, or components. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples is not to be limited to the details given herein, but may be modified within the scope of the appended claims.

What is claimed is:

1. A method comprising:
    obtaining, at a first border router arrangement associated with an enterprise, a plurality of packets included in a flow to be forwarded to at least a second border router arrangement, wherein the first border router arrangement and the second border router arrangement are in communication through at least a first set of links and a second set of links;
    forwarding the plurality of packets included in the flow onto the at least first set of links to the second border arrangement;
    obtaining, after forwarding the plurality of packets, at least a first packet included in the flow;
    determining whether to replicate the at least first packet included in the flow;
    replicating, at the first border router arrangement, the at least first packet included in the flow to create a least one duplicate of the at least first packet included in the flow when it is determined that the at least first packet included in the flow is to be replicated;
    forwarding the at least first packet included in the flow onto the at least first set of links to the second border arrangement;
    forwarding the at least one duplicate onto the at least second set of links to the second border arrangement;
    obtaining information relating to the at least first packet and the at least first set of links;
    obtaining information relating to the at least one duplicate and the at least second set of links;
    determining whether to forward the flow on the at least first set of links using the information relating to the at least first packet and the at least first set of links as well as the information relating to the at least one duplicate and the at least second set of links;
    selecting the at least first set of links for use in forwarding the flow when it is determined that the flow is to be forwarded on the at least first set of links; and
    selecting the at least second set of links for use in forwarding the flow when it is determined that the flow is not to be forwarded on the at least first set of links.

2. The method of claim 1 wherein the flow is a real-time transport protocol (RTP) flow.

3. The method of claim 2 wherein the information relating to the at least first packet and the at least first set of links is information relating to at least one selected from a group including jitter associated with the at least first set of links and packet loss associated with the at least first set of links, and wherein the information relating to the at least one packet and the at least second set of links is information relating to at least one selected from a group including jitter associated with the at least second set of links and packet loss associated with the at least second set of links.

4. The method of claim 3 wherein the information relating to the at least first packet and the at least first set of links is obtained by the first border router arrangement from the second border arrangement, and wherein the information relating to the at least one duplicate and the at least second set of links is obtained by the first border router arrangement from the second border arrangement.

5. The method of claim 3 wherein determining whether to forward the flow on the at least first set of links using the information relating to the at least first packet and the at least first set of links as well as the information relating to the at least one duplicate and the at least second set of links includes comparing the jitter associated with the at least first set of links with the jitter associated with the at least second set of links.

6. The method of claim 3 wherein determining whether to forward the flow on the at least first set of links using the information relating to the at least first packet and the at least first set of links as well as the information relating to the at least one duplicate and the at least second set of links includes comparing the packet loss associated with the at least first set of links with the packet loss associated with the at least second set of links.

7. The method of claim 1 wherein the at least first set of links is associated with a first service provider and the at least second set of links is associated with a second service provider.

8. The method of claim 1 wherein the first border router arrangement includes a first border router and a second border router, the first border router being configured to communicate with the second border router arrangement over the at least first set of links, the second border router being configured to communicate with the second border router arrangement over the at least second set of links.

9. A tangible, non-transitory computer-readable medium comprising computer program code, the computer program code, when executed, configured to:
obtain a plurality of packets included in a flow to be forwarded to a border router arrangement;
forward the plurality of packets included in the flow onto at least a first set of links to the border router arrangement;
obtain, after forwarding the plurality of packets, at least a first packet included in the flow;
determine whether to replicate the at least first packet included in the flow;
replicate the at least first packet included in the flow to create a least one duplicate of the at least first packet included in the flow when it is determined that the at least first packet included in the flow is to be replicated;
forward the at least first packet included in the flow onto at least a first set of links to the border router arrangement;
forward the at least one duplicate onto the at least second set of links to the border router arrangement;
obtain information relating to the at least first packet and the at least first set of links;
obtain information relating to the at least one duplicate and the at least second set of links;
determine whether to forward the flow on the at least first set of links using the information relating to the at least first packet and the at least first set of links as well as the information relating to the at least one duplicate and the at least second set of links;
select the at least first set of links for use in forwarding the flow when it is determined that the flow is to be forwarded on the at least first set of links; and
select the at least second set of links for use in forwarding the flow when it is determined that the flow is not to be forwarded on the at least first set of links.

10. The tangible, non-transitory computer-readable medium of claim 9 wherein the flow is a real-time transport protocol (RTP) flow.

11. The tangible, non-transitory computer-readable medium of claim 10 wherein the information relating to the at least first packet and the at least first set of links is information relating to at least one selected from a group including jitter associated with the at least first set of links and packet loss associated with the at least first set of links, and wherein the information relating to the at least one packet and the at least second set of links is information relating to at least one selected from a group including jitter associated with the at least second set of links and packet loss associated with the at least second set of links.

12. The tangible, non-transitory computer-readable medium of claim 11 wherein the information relating to the at least first packet and the at least first set of links is obtained from the border router arrangement, and wherein the information relating to the at least one duplicate and the at least second set of links is obtained from the border router arrangement.

13. The tangible, non-transitory computer-readable medium of claim 11 wherein the computer program code configured to determine whether to forward the flow on the at least first set of links using the information relating to the at least first packet and the at least first set of links as well as the information relating to the at least one duplicate and the at least second set of links is further configured to compare the jitter associated with the at least first set of links with the jitter associated with the at least second set of links.

14. The tangible, non-transitory computer-readable medium of claim 11 wherein the computer program code configured to determine whether to forward the flow on the at least first set of links using the information relating to the at least first packet and the at least first set of links as well as the information relating to the at least one duplicate and the at least second set of links is further configured to compare the packet loss associated with the at least first set of links with the packet loss associated with the at least second set of links.

15. The tangible, non-transitory computer-readable medium of claim 9 wherein the at least first set of links is associated with a first service provider and the at least second set of links is associated with a second service provider.

16. An apparatus comprising:
means for obtaining a plurality of packets included in a flow to be forwarded to a border router arrangement;
means for forwarding the plurality of packets included in the flow onto the at least first set of links to the border router arrangement;
obtaining, after forwarding the plurality of packets, at least a first packet included in the flow;
determining whether to replicate the at least first packet included in the flow;
means for replicating the at least first packet included in the flow to create a least one duplicate of the at least first packet included in the flow when it is determined that the at least first packet included in the flow is to be replicated;
means for forwarding the at least first packet included in the flow onto at least a first set of links to the border router arrangement;
means for forwarding the at least one duplicate included in the flow onto at least a second set of links to the border router arrangement;
means for obtaining information relating to the at least first packet and the at least first set of links;
means for obtaining information relating to the at least one duplicate and the at least second set of links;
means for determining whether to forward the flow on the at least first set of links using the information relating to the at least first packet and the at least first set of links as well as the information relating to the at least one duplicate and the at least second set of links;
means for selecting the at least first set of links for use in forwarding the flow when it is determined that the flow is to be forwarded on the at least first set of links; and
means for selecting the at least second set of links for use in forwarding the flow when it is determined that the flow is not to be forwarded on the at least first set of links.

17. An apparatus comprising:
a processor;
a communications interface, the communications interface being configured to communicate with a first network of a first service provider and to communicate with a second network of a second service provider, the communications interface further being configured to obtain a flow provided from an endpoint, wherein the flow includes at least a first packet;
a replication module, the replication module being configured to determine when to create at least one duplicate of the at least first packet, wherein the replication module is arranged to create the at least one duplicate when it is determined that the at least one duplicate is to be created; and
a service provider selection module, the service provider selection module being configured to cooperate with the communications interface to forward the at least first packet on the first network and to forward the at least one duplicate on the second network, the service provider selection module further being configured to obtain first information associated with the at least first packet and the first network after forwarding the at least first packet as well as second information associated with the at least one duplicate and the second network after forwarding the at least one duplicate, wherein the service provider selection module uses the first information and the second information to select either the first network or the second network to use to forward the flow.

18. The apparatus of claim 17 wherein the apparatus and the endpoint are included in an enterprise, and where the flow provided from the endpoint is provided through the enterprise.

19. The apparatus of claim 17 wherein the replication module is configured to determine when to create the at least one duplicate by determining when the flow is a real-time transport protocol (RTP) flow, wherein the replication module is arranged to create the at least one duplication when the flow is the RTP flow.

20. The apparatus of claim 17 wherein the first information includes at least one of an indication of packet loss associated with the first network, an indication of jitter associated with the first network, and an indication of latency associated with the first network, and wherein the first information is obtained from a remote border router in communication with the first network.

21. The apparatus of claim 20 wherein the second information includes at least one of an indication of packet loss associated with the second network, an indication of jitter associated with the second network, and an indication of latency associated with the second network, and wherein the second information is obtained from the remote border router, the remote border router being in communication with the second network.

* * * * *